United States Patent
Eisen et al.

(10) Patent No.: US 7,254,693 B2
(45) Date of Patent: Aug. 7, 2007

(54) SELECTIVELY PROHIBITING SPECULATIVE EXECUTION OF CONDITIONAL BRANCH TYPE BASED ON INSTRUCTION BIT

(75) Inventors: Lee Evan Eisen, Round Rock, TX (US); Francis Patrick O'Connell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 11/002,522

(22) Filed: Dec. 2, 2004

(65) Prior Publication Data

US 2006/0149944 A1 Jul. 6, 2006

(51) Int. Cl.
*G06F 9/38* (2006.01)
(52) U.S. Cl. .......................... 712/23; 712/239; 713/320
(58) Field of Classification Search .................. None
See application file for complete search history.

(56) References Cited

U.S. PATENT DOCUMENTS

| | | | |
|---|---|---|---|
| 5,367,703 A | 11/1994 | Levitan | 712/23 |
| 6,282,663 B1 * | 8/2001 | Khazam | 713/320 |
| 6,338,133 B1 * | 1/2002 | Schroter | 712/214 |
| 6,535,905 B1 * | 3/2003 | Kalafatis et al. | 718/108 |
| 6,658,447 B2 | 12/2003 | Cota-Robles | 718/103 |
| 6,766,447 B1 * | 7/2004 | Jue et al. | 713/2 |
| 2004/0181654 A1 * | 9/2004 | Chen | 712/239 |
| 2005/0235170 A1 * | 10/2005 | Atkinson | 713/320 |

* cited by examiner

*Primary Examiner*—Kenneth S. Kim
(74) *Attorney, Agent, or Firm*—Duke W. Yee; Diana R. Gerhardt; Gerald H. Glanzman (57) ABSTRACT

A method, apparatus, and computer program product are disclosed for selectively prohibiting speculative conditional branch execution. A particular type of conditional branch instruction is selected. An indication is stored within each instruction that is the particular type of conditional branch instruction. A processor then fetches a first instruction from code that is to be executed. A determination is made regarding whether the first instruction includes the indication. In response to determining that the instruction includes the indication: speculative execution of the first instruction is prohibited, an actual location to which the first instruction will branch is resolved, and execution of the code is branched to the actual location. In response to determining that the instruction does not include the indication, the first instruction is speculatively executed.

17 Claims, 4 Drawing Sheets

SELECTIVELY PROHIBITING SPECULATIVE EXECUTION OF CONDITIONAL BRANCH TYPE BASED ON INSTRUCTION BIT

BACKGROUND OF THE INVENTION

1. Technical Field

The present invention is directed to data processing systems. More specifically, the present invention is directed to a method, apparatus, and computer program product for selectively prohibiting speculative conditional branch execution.

2. Description of Related Art

Superscalar processors enable concurrent execution of instructions. Superscalar processors can be implemented within symmetric multiprocessing (SMP) systems, simultaneous multi-threading (SMT) systems, or other types of computer systems. A symmetric multiprocessing (SMP) data processing system has multiple processors that are symmetric such that each processor has the same processing speed and latency. An SMP system has one operating system that divides the work into tasks that are distributed evenly among the various processors by dispatching one software thread of work to each processor at a time. Thus, a processor in an SMP system executes only one thread at a time.

A simultaneous multi-threading (SMT) data processing system includes multiple processors that can each concurrently execute more than one thread at a time per processor. An SMT system has the ability to favor one thread over another when both threads are running on the same processor.

Known computer systems, including SMP systems, SMT systems, and other systems, typically speculatively execute conditional branch instructions in order to improve processing efficiency within the systems. A fetch engine in the processor speculates past a branch instruction in order to supply a continuous instruction stream to the decode, dispatch, and execution pipelines in order to maintain a large window of potentially executable instructions.

Instruction fetch performance depends on a number of factors. Branch prediction accuracy has been long recognized as an important factor in determining fetch performance.

Modern microprocessors routinely use a plurality of mechanisms to improve their ability to efficiently fetch past branch instructions. The prediction mechanisms allow a processor to fetch beyond a branch instruction before the outcome of the branch is known. For example, some mechanisms allow a processor to speculatively fetch beyond a branch before the branch's actual target address has been computed. These techniques use run-time history to speculatively predict what the actual target address will be. Thus, these techniques speculatively predict which instructions should be fetched by predicting what the actual target address will be.

A significant pipelined delay penalty may result from the execution of "conditional branch" instructions. Conditional branch instructions are instructions which dictate the taking of a specified conditional branch in response to a particular outcome of the processing of one or more other instructions. The conditional branch will be either taken or not taken. If the conditional branch is taken, processing will pass to a particular target address that is not the next sequential address in the code that is being processed. The instructions that are stored starting at this non-sequential target address will then be processed. If the conditional branch is not taken, processing will fall through to the next sequential address in the code. The instructions that are stored starting at this next sequential address are then processed.

Conditional branch instructions can be speculatively processed by predicting in advance whether the conditional branch instruction will be taken or not taken. If it is predicted that the conditional branch will be taken, the instructions that are stored starting at the particular non-sequential target address are speculatively executed. If it is predicted that the conditional branch will not be taken, the instructions that are stored starting at the next sequential address are speculatively executed. When the conditional branch instruction is actually resolved, it becomes known whether the conditional branch instruction will be taken. If the prediction was correct, processing continues with the speculatively executed instructions being completed. If the prediction was incorrect, the speculatively executed instructions must be flushed from the processor and the correct instructions retrieved and executed. Flushing speculatively executed instructions consumes power and processing resources unnecessarily.

With power consumption becoming an ever more critical aspect of microprocessor-based system design, mechanisms to prevent unnecessary work are of significant value to the design. Current microprocessors perform a significant amount of unnecessary work by incorrectly predicting branch instructions in which the wrong instructions past the branch are fetched, decoded, and executed only to be flushed when it is discovered that the predicted target address did not turn out to be the actual target address. Thus, the speculatively executed instructions are on the wrong path.

In modern microprocessors, branch instructions are typically predicted to be taken or not taken early in the decoding phase of instruction processing. If the actual condition on which the branch is dependent turns out to be opposite of the predicted value, the instructions which followed the branch need to be flushed and the execution of the program resumed with the correct path for the branch.

In a power sensitive environment, speculating on branches when the prediction accuracy is low is a poor trade off of performance verses power, thus lowering the performance per watt of power used. When the processor is in a simultaneous multithreaded (SMT) mode, inaccurate speculation consumes power as well as cycles that another thread in the processor could have exploited.

Branch prediction accuracy can vary widely depending upon many factors. If the consumption of power is an important factor, turning off branch prediction can reduce power substantially but may also substantially reduce performance.

Therefore, a need exists for a method, system, and computer program product for preventing speculative execution for particular types of branch instructions that tend to be unreliably predicted in order to save power and improve processor performance.

SUMMARY OF THE INVENTION

A method, apparatus, and computer program product are disclosed for selectively prohibiting speculative conditional branch execution. A particular type of conditional branch instruction is selected. An indication is stored within each instruction that is the particular type of conditional branch instruction. A processor then fetches a first instruction from code to be executed. A determination is made, by examining the first instruction's opcode, regarding whether the first instruction includes the indication. In response to determining that the instruction includes the indication: speculative execution of the first instruction is prohibited, an actual location to which the first instruction will branch is resolved, and execution of the code is branched to the actual location. In response to determining that the instruction does not include the indication, the first instruction is speculatively executed.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, apparatus, and computer program product for selectively prohibiting speculative conditional branch execution. A particular type of conditional branch instruction is selected. The opcode for the selected type of conditional branch instruction is modified by using a previously unused bit in the opcode. When this bit is set for a particular instruction, the instruction will not be speculatively executed. Thus, instructions that follow the particular instruction in the code also will not be speculatively executed. When this bit is cleared, the instruction and the instructions that follow it may be speculatively executed.

When a conditional branch is speculatively executed, a prediction is made as to whether the conditional branch will be taken or not. A predicted target address is then determined. The instructions that are located in the code starting at this target address will also be speculatively executed. The conditional branch is then resolved to determine the actual location to which this branch will branch to. If the predication is correct and the target address and predicted addresses are the same, the instructions, including the branch and the instructions that follow the branch that were speculatively executed, are allowed to complete. If the prediction is incorrect and the target and predicted addresses are different, the instructions that were speculatively executed that were stored starting at the target address are flushed.

The actual location will be either the next sequential address in the code or will be a non-sequential address that is an address that is not the next sequential address in the code. When the conditional branch is taken, the actual address is the non-sequential target address. When the conditional branch is not taken, the actual address is the next sequential address.

The present invention prohibits speculative execution for selected types of conditional branch instructions. When a conditional branch instruction is fetched, the specified bit is checked. If the bit is set, the conditional branch instruction will not be speculatively executed. If the bit is cleared, the conditional branch instruction can be speculatively executed.

The present invention saves power in the processor by not executing speculative instructions in cases where it has been determined that the speculative instructions are likely to be ultimately flushed. In addition to saving power, the present invention gives other threads in an SMT processor more processing cycles. Thus, on a single threaded processor, no speculative work is done when the bit is set thereby saving power. On a multi-threaded processor, e.g., an SMT processor, instead of wasting cycles and thereby power on speculative work, the other threads in the processor get more resources to use to perform productive work.

If the present invention is implemented on a single thread processor, the processor stops processing until the actual branch target is calculated. If the present invention is implemented on a multi-thread processor such as an SMT processor, the resources of the SMT processor will be given to the other threads that are executing on the processor.

Particular types of condition branch instructions are selected for non-speculative processing. These instructions are instructions that are not accurately predicted. Any known method may be used to track the prediction accuracy of conditional branch instructions. For example, a branch history table, branch processing heuristics, or any other suitable method may be used.

According to the present invention, instructions can be selected by a programmer or can be selected automatically within a compiler that could be programmed to select instructions that have accuracy prediction rates below a threshold.

A superscalar processor includes a number of stages, such as the following, in the processor pipeline. In a typical first stage, referred to as an instruction fetch stage, an instruction is fetched from memory or associative memory structure, each stage including one or more pipelines. Then, in a decode stage, the instruction is decoded into different control bits, which in general designate (1) a type of functional unit for performing the operation specified by the instruction, (2) source operands for the operation, and (3) destinations for results of operations.

In a dispatch stage, the decoded instruction is dispatched per the control bits to a unit having an execution stage, or possibly to an intervening reservation station, which ultimately issues the instruction to an associated execution stage (also "execution unit").

The execution stage processes the operation as specified by the instruction. Executing an operation specified by an instruction includes accepting one or more operands and producing one or more results. Oftentimes the instructions will be out-of-order.

A completion stage deals with program order issues that arise from concurrent execution, wherein multiple, concurrently executed instructions may deposit results in a single register. It also handles recovery issues arising from instructions subsequent to an interrupted instruction depositing results in their destination registers. This stage is also sometimes called a write back stage since it is at this time that results of the execution of instructions are written back to designated locations such as registers.

Figure 1:
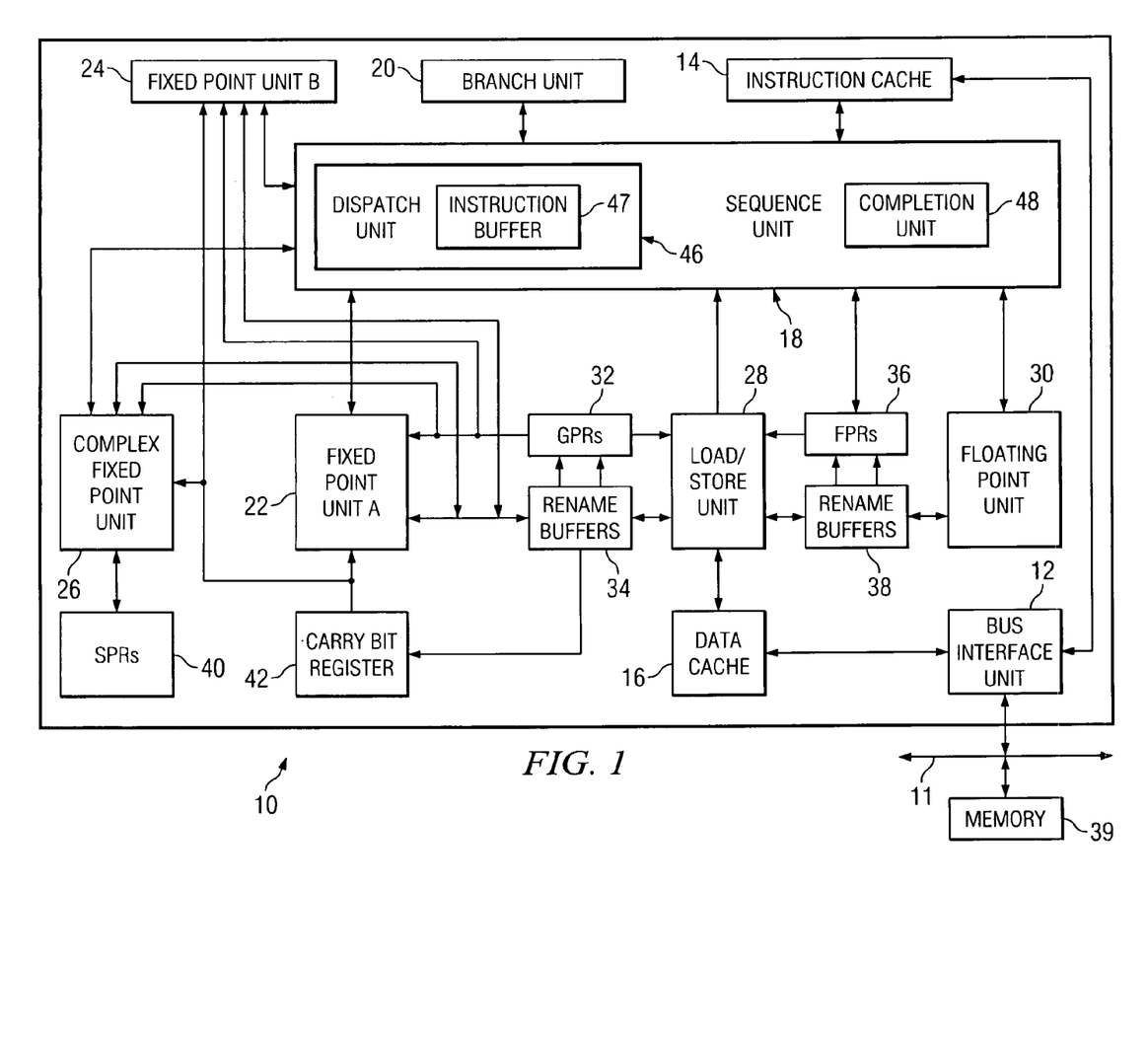
FIG. 1 is a block diagram of a superscalar processor that can be used to implement the present invention in accordance with the present invention.

FIG. 1 is a block diagram of a superscalar processor that can be used to implement the present invention in accordance with the present invention. As shown, the superscalar processor 10 typically includes a system bus 11 connected to a bus interface unit ("BIU") 12. BIU 12 controls the transfer of information between processor 10 and system bus 11. BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26, and LSU 28 input their source operand information from general purpose architectural registers ("GPRs") 32 and fixed point rename buffers 34. Moreover, FXUA 22 and FXUB 24 input a "carry bit" from a carry bit ("CA") register 42. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

Figure 2:
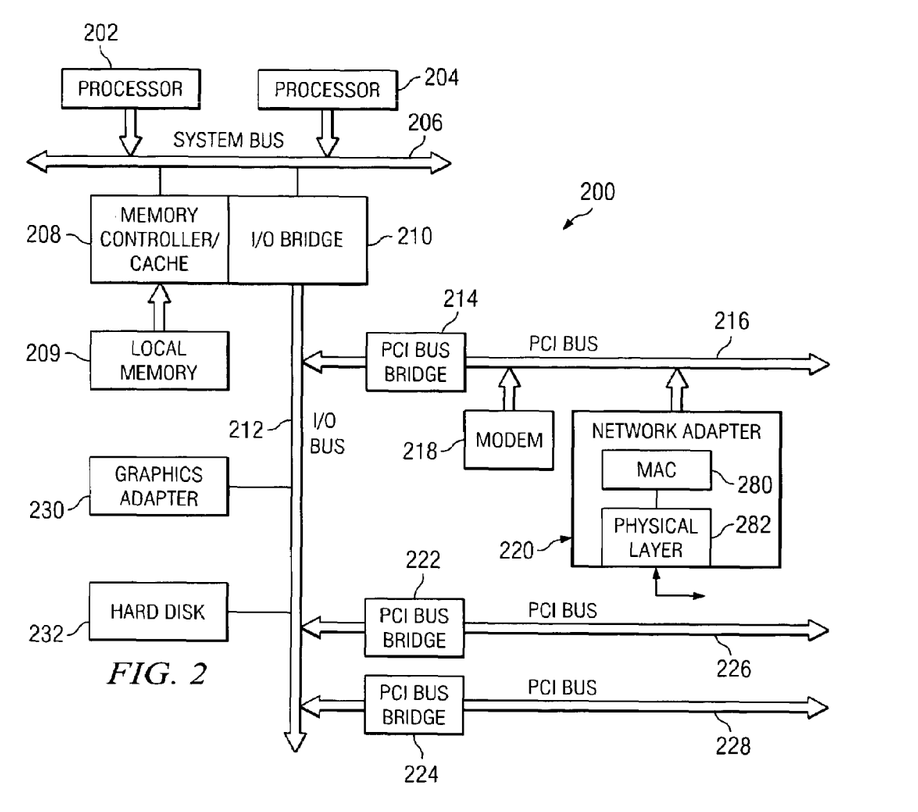
FIG. 2 is an illustration of a computer system which includes a processor, such as the one depicted by FIG. 1, in accordance with the present invention.

FIG. 2 is an illustration of a computer system which includes a processor, such as the one depicted by FIG. 1, in accordance with the present invention. Data processing system 200 may be a symmetric multiprocessor (SMP) system including a plurality of processors 202 and 204 connected to system bus 206. Alternatively, a single processor system may be employed. Each processor 202 and 204 may be an SMT-enabled processor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example an Ethernet network over an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
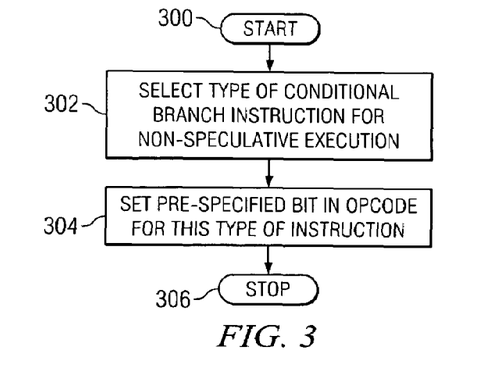
FIG. 3 illustrates a high level flow chart that depicts selecting types of conditional branch instructions for selective non-speculative execution and altering the opcode for these selected types of conditional branch instructions in accordance with the present invention.

FIG. 3 illustrates a high level flow chart that depicts selecting types of conditional branch instructions for selective non-speculative execution and altering the opcode for these selected types of conditional branch instructions in accordance with the present invention. The process starts as depicted by block 300 and thereafter passes to block 302 which illustrates selecting a type of conditional branch instruction for non-speculative execution. Next, block 304 depicts setting a pre-specified bit in the operation code (opcode) for each instruction that is that type of conditional branch instruction. Thus, each time an instruction of this type is fetched, the instruction's opcode will indicate that the conditional branch instruction is not to be speculatively executed. The process then terminates as illustrated by block 306.

Figure 4:
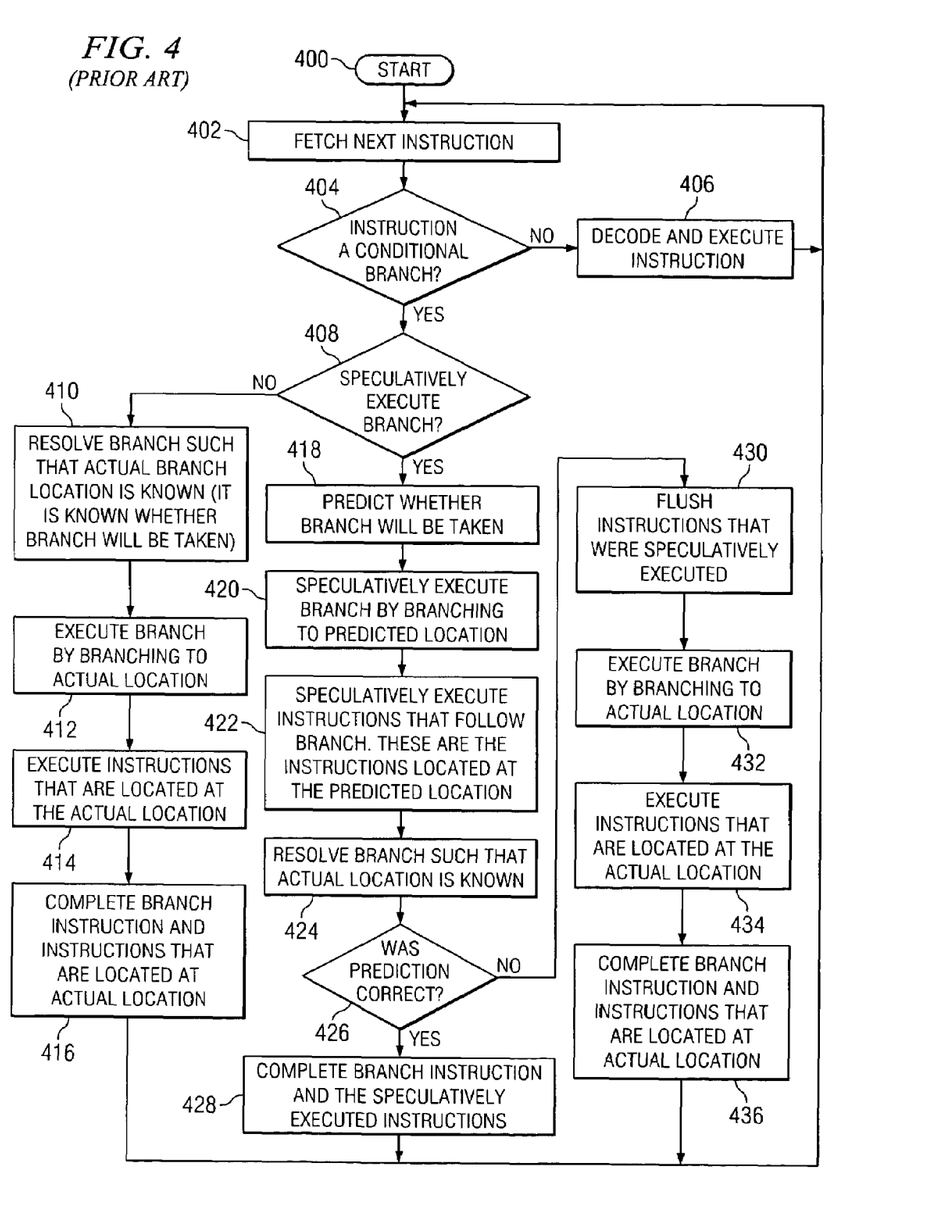
FIG. 4 depicts a high level flow chart that illustrates executing conditional branch instructions in accordance with the prior art.

FIG. 4 depicts a high level flow chart that illustrates executing conditional branch instructions in accordance with the prior art. The process starts as depicted by block 400 and thereafter passes to block 402 which illustrates fetching the next instruction. Next, block 404 depicts a determination of whether or not the fetched instruction is a conditional branch instruction. If a determination is made that the fetched instruction is not a conditional branch instruction, the process passes to block 406 which illustrates decoding and executing the fetched instruction. The process then passes back to block 402.

Referring again to block 404, if a determination is made that the instruction is a conditional branch instruction, the process passes to block 408 which illustrates a determination of whether or not speculative execution is enabled. According to the prior art, speculative execution can be enabled or disabled. When speculative execution is enabled, all conditional branch instructions are speculatively executed. When speculative execution is disabled, no conditional branch instructions are speculatively executed.

If a determination is made that speculative execution is disabled, the process passes to block 410 which depicts resolving the conditional branch instruction such that the actual conditional branch location is known prior to execution the conditional branch. Thus, it is known whether this conditional branch instruction will be executed. Next, block 412 depicts executing the conditional branch instruction by branching to the actual branch location. The process then passes to block 414 which illustrates executing the instructions that are located at the actual location. Block 416, then, depicts completing the conditional branch instruction and the instructions located at the actual location (as depicted by block 414). The process then passes back to block 402.

Referring again to block 408, if a determination is made speculative execution is disabled, the process passes to block 418 which illustrates predicting whether the conditional branch will be taken. The process then passes to block 420 which depicts speculatively executing the conditional branch instruction by branching to the predicted location. When a conditional branch instruction is speculatively executed, a prediction is made as to what address the conditional branch instruction will branch to. The instructions that are stored starting at this predicted address are then speculatively executed. Block 422, then, illustrates speculatively executing the instructions that follow the branch. These are the instructions that are location at the predicted branch location. Next, block 424 depicts resolving the conditional branch such that the actual location is now known.

Block 426, then, illustrates a determination of whether or not the branch location was correctly predicted. The branch location was correctly predicted when the predicted location and the actual location are the same. If a determination is made that the branch location was correctly predicted, the process passes to block 428 which depicts completing the branch instruction and the speculatively executed instructions. The process then passes back to block 402.

Referring again to block 426, if a determination is made that the prediction was not correct, the process passes to block 430 which depicts flushing the instructions that were speculatively executed. Next, block 432 illustrates executing the branch instruction by branching to the actual branch location. Thereafter, block 434 depicts executing the instructions that now follow the branch. These are the instructions that are located at the actual location. Next, block 436 illustrates completing the branch instruction and the instructions that are located at the actual location. The process then passes back to block 402.

Figure 5:
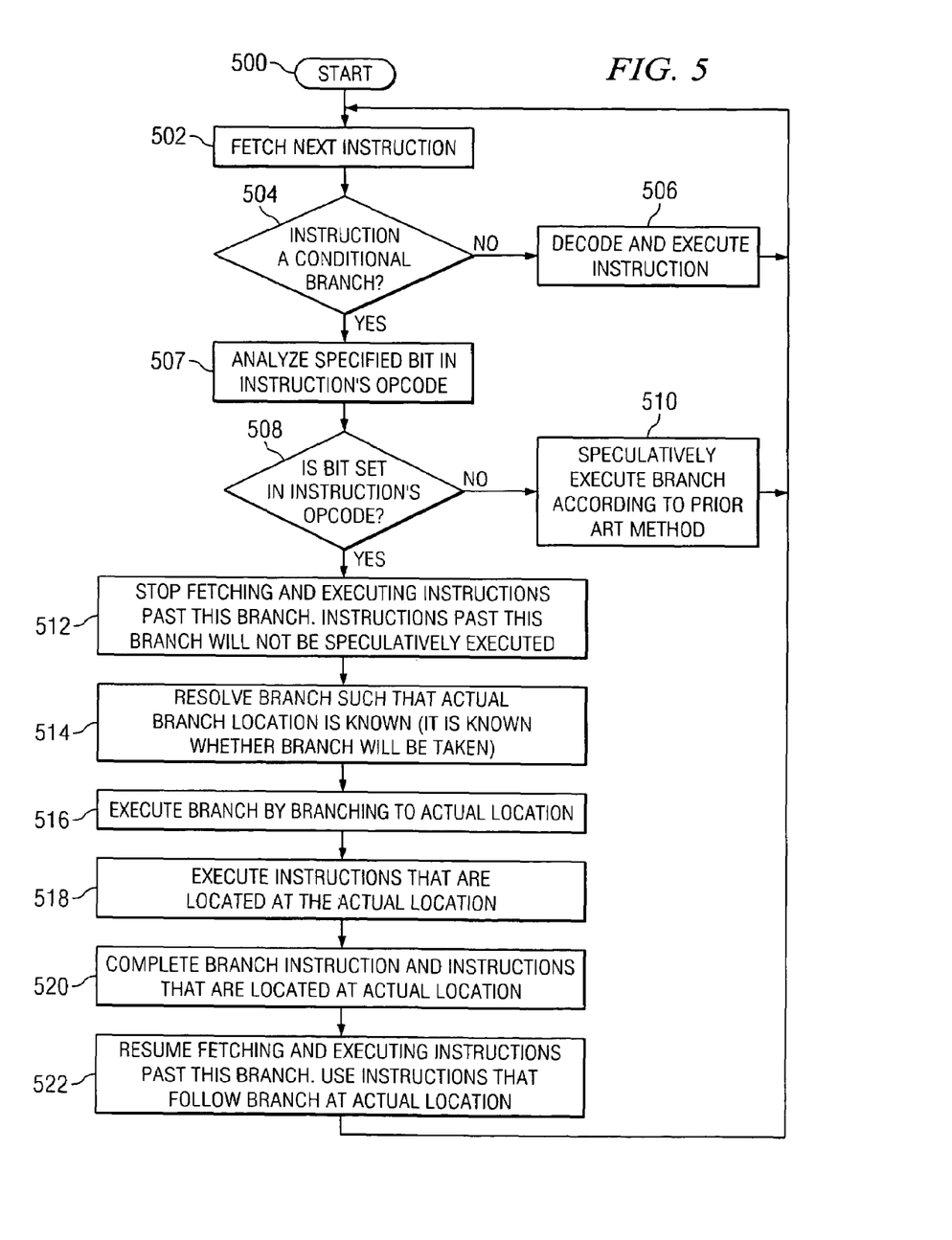
FIG. 5 illustrates a high level flow chart that depicts selectively prohibiting speculative execution of selected types of conditional branch instructions in a processor in which speculative execution is enabled in accordance with the present invention.

FIG. 5 illustrates a high level flow chart that depicts selectively prohibiting speculative execution of selected types of conditional branch instructions in a processor in which speculative execution is enabled in accordance with the present invention. The process starts as depicted by block 500 and thereafter passes to block 502 which illustrates fetching the next instruction from code that is being executed. Next, block 504 depicts a determination of whether or not the instruction is a conditional branch instruction. If a determination is made that the instruction is not a conditional branch instruction, the process passes to block 506 which illustrates decoding and executing the fetched instruction. The process then passes to block 502.

Referring again to block 504, if a determination is made that the instruction is a conditional branch instruction, the process passes to block 507 which illustrates analyzing the specified bit in this instruction's opcode. Next, block 508 depicts a determination of whether or not the pre-selected bit in the opcode for this branch instruction is set. If a determination is made that the pre-selected bit is not set, the process passes to block 510 which illustrates speculatively executing the branch instruction according to the prior art method described in FIG. 4. The process then passes back to block 502.

Referring again to block 508, if a determination is made that the pre-selected bit is set, the process passes to block 512 which depicts stopping the fetching and executing of instructions past this branch instruction. Instructions past this branch instruction, whether the instructions are located in the next sequential address or at a non-sequential target address location, will not be speculatively executed. Block 514, then, illustrates resolving this conditional branch instruction such that the actual branch location is known, i.e. it is known whether the branch will be taken. Next, block 516 depicts executing the branch instruction by branching to the actual branch location. Thereafter, block 518 depicts executing instructions that are located at the actual location. Next, block 520 illustrates completing the branch instruction and the instructions that are located at the actual location. Block 522, then, illustrates resuming the fetching and executing of instructions past this branch instruction. Thus, the instructions that are located at the actual branch location are executed. The process then passes back to block 502.

According to the present invention, selected conditional branch instructions are not speculatively executed when speculative execution within a processor is enabled. Types of conditional branch instructions that are not accurately predicted are selected for non-speculative execution. Any known method may be used to track the prediction rate for conditional branch instructions.

According to the present invention, a bit in the opcode of the selected types of conditional branch instructions is set. When instructions are fetched, if the instruction is a conditional branch instruction, the bit is analyzed. If the bit is set, the instruction is not speculatively executed. If the bit is cleared, the instruction is speculatively executed.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for selectively prohibiting speculative conditional branch execution, said method comprising:

selecting a particular type of conditional branch instruction;

including an indication within each instruction that is said particular type of conditional branch instruction, said indication comprising setting of a specified bit within an opcode of each instruction that is said particular type of conditional branch instruction;

fetching, by a processor, a first instruction to be executed;

determining whether said first instruction includes said indication;

in response to determining that said first instruction includes said indication:
   prohibiting speculative execution of said first instruction;
   resolving an actual location to which said first instruction will branch; and
   branching to said actual location; and in response to determining that said first instruction does not include said indication:
   speculatively executing said first instruction.

2. The method according to claim 1, further comprising:
after branching to said actual location, executing second instructions that are stored starting at said actual location without speculatively executing said second instructions.

3. The method according to claim 1, wherein speculatively executing said first instruction comprises speculatively executing said first instruction by predicting a predicted branch location; and wherein the method further comprises:
   speculatively executing third instructions that are stored starting at said predicted branch location;
   resolving an actual location to which said first instruction will branch;
   determining whether said actual location is the same as said predicted location; and
   in response to determining that said actual location is not the same as said predicted location, flushing said speculatively executed third instructions from said processor.

4. The method according to claim 1, further comprising:
in response to determining that said first instruction includes said indication, executing second instructions that are stored starting at said actual location without flushing speculatively executed instructions from said processor.

5. The method according to claim 1, further comprising:
determining whether said first instruction is a type of conditional branch instruction; and
in response to determining that said first instruction is a type of conditional branch instruction, determining whether said first instruction includes said indication.

6. The method according to claim 1, further comprising:
reducing power consumption in said processor when said first instruction includes said indication by avoiding flushing speculatively executed instructions when a conditional branch instruction was incorrectly predicted.

7. The method according to claim 1, further comprising:
executing a first thread that fetches said first instruction;
granting additional processing cycles to threads other than said first thread that are executing within said processor when said first instruction includes said indication by avoiding flushing speculatively executed instructions when a conditional branch instruction was incorrectly predicted.

8. The method according to claim 1, wherein selecting a particular type of conditional branch instruction comprises:
selecting a particular type of conditional branch instruction that is not predicted with a particular level of accuracy.

9. An apparatus in a data processing system for selectively prohibiting speculative conditional branch execution, said apparatus comprising:
   a particular type of conditional branch instruction being selected;
   an indication included within each instruction that is said particular type of conditional branch instruction, said indication comprising setting of a specified bit within an opcode of each instruction that is said particular type of conditional branch instruction;
   a processor for fetching a first instruction to be executed;
   said processor determining whether said first instruction includes said indication;
   in response to determining that said first instruction includes said indication:
      said processor prohibiting speculative execution of said first instruction;
      said processor resolving an actual location to which said first instruction will branch; and
      said processor branching to said actual location; and
   in response to determining that said first instruction does not include said indication,
      said processor speculatively executing said first instruction.

10. The apparatus according to claim 9, further comprising:
after branching to said actual location, said processor executing second instructions that are stored starting at said actual location without speculatively executing said second instructions.

11. The apparatus according to claim 9, wherein said processor speculatively executing said first instruction comprises said processor speculatively executing said first instruction by predicting a predicted branch location; and wherein the apparatus further comprises:
   said processor speculatively executing third instructions that are stored starting at said predicted branch location;
   said processor resolving an actual location to which said first instruction will branch;
   said processor determining whether said actual location is the same as said predicted location; and
   in response to determining that said actual location is not the same as said predicted location, said processor flushing said speculatively executed third instructions from said processor.

12. The apparatus according to claim 9, further comprising:
in response to determining that said first instruction includes said indication, said processor executing second instructions that are stored starting at said actual location without flushing speculatively executed instructions from said processor.

13. The apparatus according to claim 9, further comprising:
   said processor determining whether said first instruction is a type of conditional branch instruction; and
   in response to determining that said first instruction is a type of conditional branch instruction, said processor determining whether said first instruction includes said indication.

14. The apparatus according to claim 9, further comprising:

power consumption in said processor being reduced when said first instruction includes said indication by avoiding flushing speculatively executed instructions when a conditional branch instruction was incorrectly predicted.

15. The apparatus according to claim 9, further comprising:

a first thread being executed that fetches said first instruction from code to be executed;

additional processing cycles being granted to threads other than said first thread that are executing within said processor when said first instruction includes said indication by avoiding flushing speculatively executed instructions when a conditional branch instruction was incorrectly predicted.

16. The apparatus according to claim 9, further comprising:

a particular type of conditional branch instruction being selected that is not predicted with a particular level of accuracy.

17. A computer program product in a data processing system for selectively prohibiting speculative conditional branch execution, said product comprising:

instructions for selecting a particular type of conditional branch instruction;

instructions for including an indication within each instruction that is said particular type of conditional branch instruction, said indication comprising setting of a specified bit within an opcode of each instruction that is said particular type of conditional branch instruction;

instructions for fetching, by a processor, a first instruction to be executed;

instructions for determining whether said first instruction includes said indication;

in response to determining that said instruction includes said indication:

instructions for prohibiting speculative execution of said first instruction;

instructions for resolving an actual location to which said first instruction will branch; and instructions for branching to said actual location; and in response to determining that said first instruction does not include said indication:

instructions for speculatively executing said first instruction.

* * * * *